(12) United States Patent
Manacci et al.

(10) Patent No.: US 11,310,134 B2
(45) Date of Patent: Apr. 19, 2022

(54) METHOD AND SYSTEM FOR TRACKING DEVICE INVENTORY AND UTILIZATION

(71) Applicant: JPMorgan Chase Bank, N.A., New York, NY (US)

(72) Inventors: Gina Manacci, Chagrin Falls, OH (US); Simon Lane, Chatham, NJ (US); David Anselmo, New York, NY (US); Alpa Stamp, Chorleywood (GB); Jonathan M Baum, Brooklyn, NY (US); Chetan Trikha, New York, NY (US); Jerome Rulewicz, Jr., Bear, DE (US); Rakesh Bhola, Singapore (SG); Nick Rosenberg, Flower Mound, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/816,935

(22) Filed: Mar. 12, 2020

(65) Prior Publication Data
US 2021/0288894 A1    Sep. 16, 2021

(51) Int. Cl.
*H04L 12/26* (2006.01)
*H04L 43/065* (2022.01)
(Continued)

(52) U.S. Cl.
CPC .......... *H04L 43/065* (2013.01); *H04L 43/06* (2013.01); *H04L 61/6022* (2013.01); *H04L 67/18* (2013.01); *H04L 67/22* (2013.01); *H04W 4/029* (2018.02); *H04W 8/22* (2013.01); *H04W 8/24* (2013.01); *H04W 24/08* (2013.01); *H04W 64/003* (2013.01)

(58) Field of Classification Search
CPC ....... H04L 43/065; H04L 43/06; H04L 67/22; H04L 67/18; H04L 61/6022; H04W 8/24; H04W 8/22; H04W 64/003; H04W 24/08; H04W 4/029
See application file for complete search history.

(56) References Cited

U.S. PATENT DOCUMENTS

| 7,246,374 | B1 * | 7/2007 | Simon | G06F 9/543 |
|---|---|---|---|---|
| | | | | 713/167 |
| 9,922,094 | B1 * | 3/2018 | Perumal | H04W 4/029 |

(Continued)

FOREIGN PATENT DOCUMENTS

WO    WO-2008153978 A2 * 12/2008 ............. G06Q 40/02

*Primary Examiner* — Michael A Keller
(74) *Attorney, Agent, or Firm* — Greenblum & Bernstein, P.L.C.

(57) ABSTRACT

A method and a computing apparatus for tracking device utilization are provided. The method includes: obtaining first data that relates to a physical location of a device; obtaining second data that relates to network switch information of the device; obtaining third data that relates to a network activity performed by using the device; using each of the first data, second data, and third data to determine a utilization of the device; and outputting a result of the determination. The first data may include a building identification, a floor number, and/or a seat identification. The second data may include a switch host name, card information, and/or port information. The third data may include a management system into which the device is logged in.

16 Claims, 7 Drawing Sheets

(51) Int. Cl.
*H04W 4/029* (2018.01)
*H04W 64/00* (2009.01)
*H04W 8/22* (2009.01)
*H04L 67/52* (2022.01)
*H04L 101/622* (2022.01)
*H04W 24/08* (2009.01)
*H04L 67/50* (2022.01)
*H04L 43/06* (2022.01)
*H04W 8/24* (2009.01)

(56) References Cited

U.S. PATENT DOCUMENTS

| | | | |
|---|---|---|---|
| 2009/0106549 A1* | 4/2009 | Mohamed | G06F 21/6218 713/156 |
| 2009/0185553 A1* | 7/2009 | Kodaka | H04Q 3/0045 370/352 |
| 2015/0095479 A1* | 4/2015 | Chen | H04L 63/20 709/223 |
| 2019/0171890 A1* | 6/2019 | Yu | G06K 9/00825 |
| 2019/0325355 A1* | 10/2019 | Gladwin | G06Q 10/1093 |
| 2019/0392356 A1* | 12/2019 | Munir | H04L 67/42 |
| 2020/0196193 A1* | 6/2020 | Wojnicz | H04W 28/08 |
| 2020/0252410 A1* | 8/2020 | Casey | G06F 21/64 |
| 2021/0057059 A1* | 2/2021 | Chahal | G06Q 50/00 |

\* cited by examiner

METHOD AND SYSTEM FOR TRACKING DEVICE INVENTORY AND UTILIZATION

BACKGROUND

1. Field of the Disclosure

This technology generally relates to methods and systems for tracking device inventory and utilization.

2. Background Information

Many organizations have a need to track desk utilization and to inform individuals, such as employees, as to the availability of a space and the technology associated with that space. This need has increased in recent times with the shift, to an untethered, flexible technology environment.

In many instances, especially for relatively large organizations, employees may be either working at their regular place of work, working on a temporary assignment at a different location that usual, or working from home. An organization has limited resources, from both a physical standpoint and a technological standpoint, and as such, the organization may have a need to keep track of the availability of these resources, in order to facilitate day-to-day operations and also to inform as to future equipment needs.

Accordingly, there is a need for a tool that enables organizations to track device inventory and utilization.

SUMMARY

The present disclosure, through one or more of its various aspects, embodiments, and/or specific features or sub-components, provides, inter alia, various systems, servers, devices, methods, media, programs, and platforms for tracking device inventory and utilization.

According to an aspect of the present disclosure, a method for tracking device utilization is provided. The method is implemented by at least one processor. The method includes: obtaining first data that relates to a physical location of a device; obtaining second data that relates to network switch information of the device; obtaining third data that relates to a network activity performed by using the device; using each of the first data, second data, and third data to determine a utilization of the device; and outputting a result of the determination.

The first data may include at least one of a building identification, a floor number, and a seat identification.

The second data may include at least one of a switch host name, card information that relates to a first seat, and port information that relates to the first seat.

The method may further include determining an occupancy of a first area based at least in part on the determined utilization.

The method may further include: determining a space availability with respect to a first space based at least in part on the determined utilization; and outputting information relating to the determined space availability and information relating to a technology associated with the first space.

The method may further include: performing a Media Access Control (MAC) scan in order to collect at least one of a workstation number, a telephone identifier, a virtual desktop infrastructure (VDI) identifier, a laptop identifier, a desktop identifier, a video conference device identifier, and a network device identifier; and using the collected at least one of the workstation number, telephone identifier, VDI identifier, laptop identifier, desktop identifier, video conference device identifier, and network device identifier to obtain the second data.

The obtaining of the third data may include determining each of at least one management system into which the device is logged in.

The method may further include using a security identification (SID) associated with a user together with the obtained third data in order to determine the user of the device.

The obtaining of the first data may include obtaining data that relates to a respective physical location of each of a plurality of devices within a first area. The obtaining of the second data may include obtaining data that relates to respective network switch information of each of the plurality of devices within the first area. The obtaining of the third data may include obtaining data that relates to a respective network activity performed by using each of the plurality of devices within the first area. The first data, the second data, and the third data may be used to determine a respective utilization of each of the plurality of devices within the first area.

The outputting may include outputting a complete mapping of an infrastructure of the first area.

According to another aspect of the present disclosure, a computing apparatus for tracking device utilization is provided. The computing apparatus includes a processor, a memory, and a communication interface coupled to each of the processor and the memory. The processor is configured to: obtain first data that relates to a physical location of a device; obtain second data that relates to network switch information of the device; obtain third data that relates to a network activity performed by using the device; use each of the first data, second data, and third data to determine a utilization of the device; and output, via the communication interface, a result of the determination.

The first data may include at least one of a building identification, a floor number, and a seat identification.

The second data may include at least one of a switch host name, card information that relates to a first seat, and port information that relates to the first seat.

The processor may be further configured to determine an occupancy of a first area based at least in part on the determined utilization.

The processor may be further configured to: determine a space availability with respect to a first space based at least in part on the determined utilization; and output, via the communication interface, information relating to the determined space availability and information relating to a technology associated with the first space.

The processor may be further configured to: perform a Media Access Control (MAC) scan in order to collect at least one of a workstation number, a telephone identifier, a virtual desktop infrastructure (VDI) identifier, a laptop identifier, a desktop identifier, a video conference device identifier, and a network device identifier; and use the collected at least one of the workstation number, telephone identifier, VDI identifier, laptop identifier, desktop identifier, video conference device identifier, and network device identifier to obtain the second data.

The processor may be further configured to obtain the third data by determining each of at least one management system into which the device is logged in.

The processor may be further configured to use a security identification (SID) associated with a user together with the obtained third data in order to determine the user of the device.

The processor may be further configured to: obtain first data that relates to a respective physical location of each of a plurality of devices within a first area; obtain second data that relates to respective network switch information of each of the plurality of devices within the first area; obtain third data that relates to a respective network activity performed by using each of the plurality of devices within the first area; and use each of the first data, the second data, and the third data to determine a respective utilization of each of the plurality of devices within the first area.

The processor may be further configured to output, via the communication interface, a complete mapping of an infrastructure of the first area.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
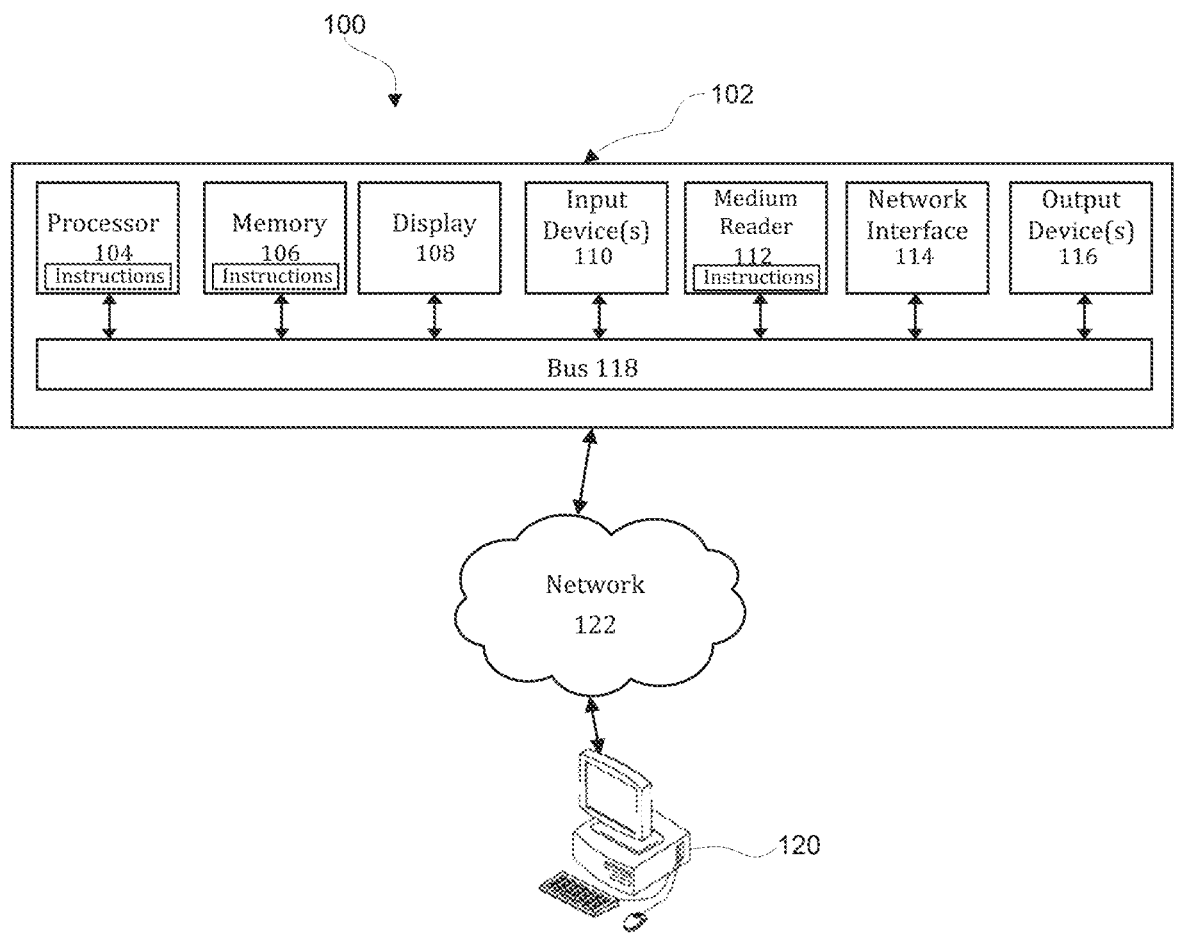
FIG. 1 illustrates an exemplary computer system.

FIG. 1 is an exemplary system for use in accordance with e embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 Which is configured to read any one or more sets of instructions, e.g. software, from any of the memories described herein. The instructions, when executed by a processor, can be used to perform one or ore of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for tracking device inventory and utilization.

Figure 2:
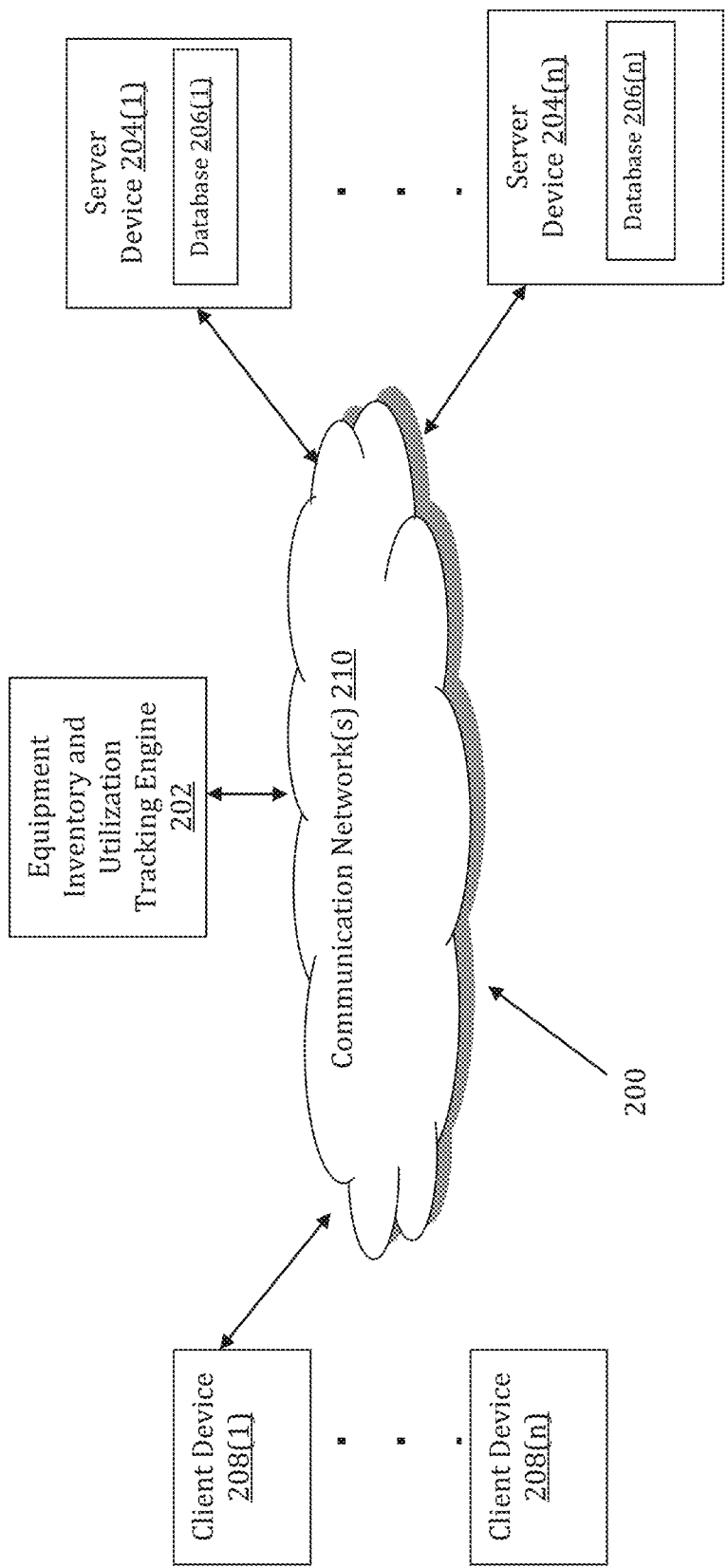
FIG. 2 illustrates an exemplary diagram of a network environment.

Referring to FIG. 2, a schematic of an exemplary network environment 200 for implementing a method for tracking device inventory and utilization is illustrated. In an exemplary embodiment, the method is executable on any networked computer platform, such as, for example, a personal computer (PC).

The method for tracking device inventory and utilization may be implemented by an Equipment Inventory and Utilization Tracking Engine (EIUTE) device 202. The EIUTE device 202 may be the same or similar to the computer system 102 as described with respect to FIG. 1. The EIUTE device 202 may store one or more applications that can include executable instructions that, when executed by the EIUTE device 202, cause the EIUTE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the EIUTE device 202 itself, may be located in virtual server(s) running in a cloud based computing environment rather than being tied to one or more specific physical network computing devices. Also, the application(s) may be running in one or more virtual machines (VMs) executing on the EIUTE device 202. Additionally, in one or more embodiments of this technology, virtual machine(s) running on the EIUTE device 202 may be managed or supervised by a hypervisor.

In the network environment 200 of FIG. 2, the EIUTE device 202 is coupled to a plurality of server devices 204(1)-204(n) that hosts a plurality of databases 206(1)-206(n), and also to a plurality of client devices 208(1)-208(n) via communication network(s) 210. A communication interface of the EIUTE device 202, such as the network interface 114 of the computer system 102 of FIG. 1, operatively couples and communicates between the EIUTE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the EIUTE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and EIUTE devices that efficiently implement a method for tracking device inventory and utilization.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The EIUTE device 202 may be a standalone device or integrated with one or more other devices or apparatuses, such as one or more of the server devices 204(1)-204(n), for example. In one particular example, the EIUTE device 202 may include or be hosted by one of the server devices 204(1)-204(n), and other arrangements are also possible. Moreover, one or more of the devices of the EIUTE device 202 may be in a same or a different communication network including one or more public, private, or cloud networks, for example.

The plurality of server devices 204(l)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the EIUTE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store space-specific equipment data, such as physical location data that indicates geographical location information, floor number information, and seat identification information for various devices and equipment items, and technology-specific utilization data, which includes data that indicates switch host information, card information, port information, and management system information that pertains to the various devices and equipment items.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a duster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the EIUTE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the EIUTE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the EIUTE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the EIUTE device 202, the server devices 204(1)-204(n), or the client devices 208(1)-208(n), for example, may be configured to operate as virtual instances on the same physical machine. In other words, one or more of the EIUTE device 202, the server devices 204(l)-204(n), or the client devices 208(1)-208(n) may operate on the same physical device rather than as separate devices communicating through communication network(s) 210. Additionally, there may be more or fewer EIUTE devices 202, server devices 204(1)-204(n), or client devices 208(l)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
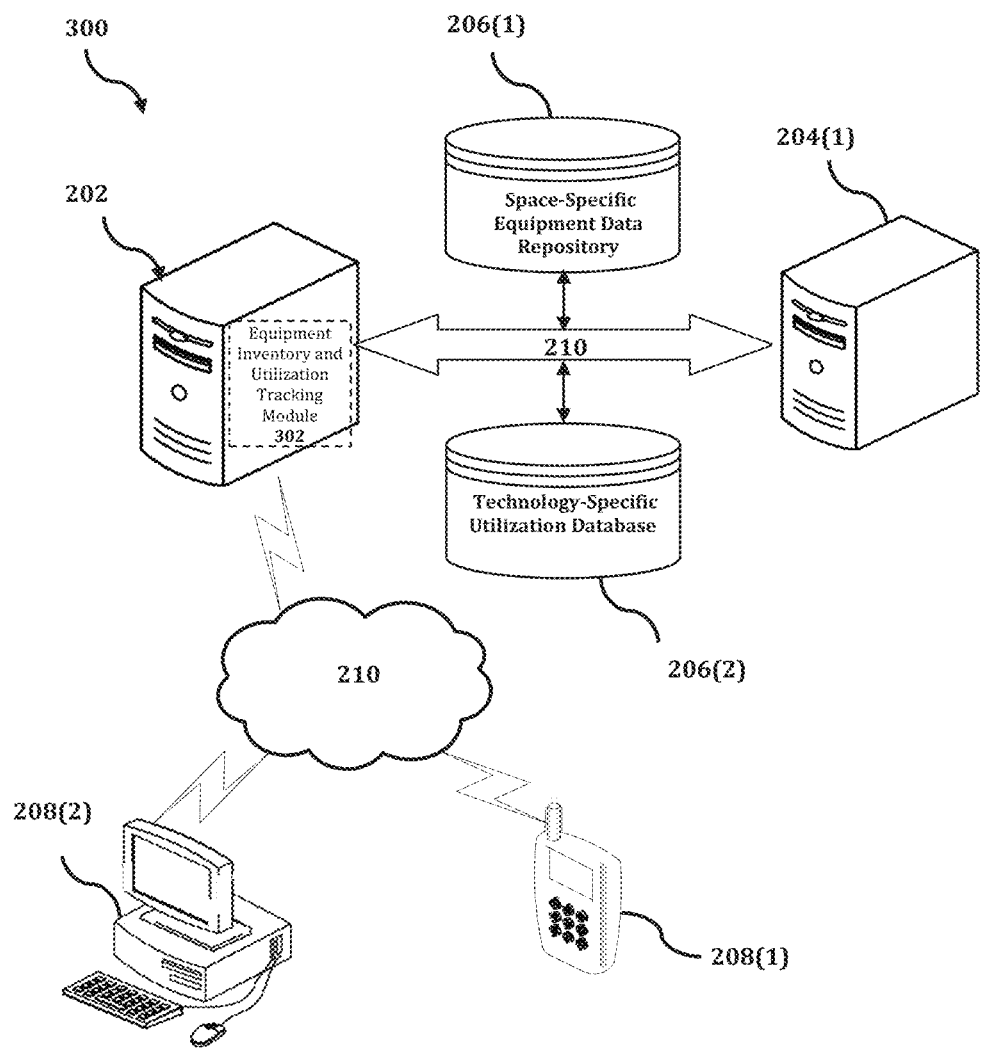
FIG. 3 shows an exemplary system for implementing a method for tracking device inventory and utilization.

The EIUTE device 202 is described and shown in FIG. 3 as including an equipment inventory and utilization tracking module 302, although it may include other rules, policies, modules, databases, or applications, for example. As will be described below the equipment inventory and utilization tracking module 302 is configured to implement a method for tracking device inventory and utilization in an automated, efficient, scalable, and reliable manner.

An exemplary process 300 for implementing a method for tracking device inventory and utilization by utilizing the network environment of FIG. 2 is shown as being executed in FIG. 3. Specifically, a first client device 208(1) and a second client device 208(2) are illustrated as being in communication with MITE device 202. In this regard, the first client device 208(1) and the second client device 208(2) may be "clients" of the EIUTE device 202 and are described herein as such. Nevertheless, it is to be known and understood that the first client device 208(1) and/or the second client device 208(2) need not necessarily be "clients" of the EIUTE device 202, or any entity described in association there with herein. Any additional or alternative relationship may exist between either or both of the first client device 208(1) and the second client device 208(2) and the EIUTE device 202, or no relationship may exist.

Further, EIUTE device 202 is illustrated as being able to access a space-specific equipment data repository 206(1) and a technology-specific utilization database 206(2). The equipment inventory and utilization tracking module 302 may be configured to access these databases for implementing a method for tracking device inventory and utilization.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the EIUTE device 202 via broadband or cellular communication. Of course, these embodiments are merely exemplary and are not limiting or exhaustive.

Upon being started, the equipment inventory and utilization tracking module 302 executes a process for tracking device inventory and utilization. An exemplary process for tracking device inventory and utilization is generally indicated at flowchart 400 in FIG. 4.

Figure 4:
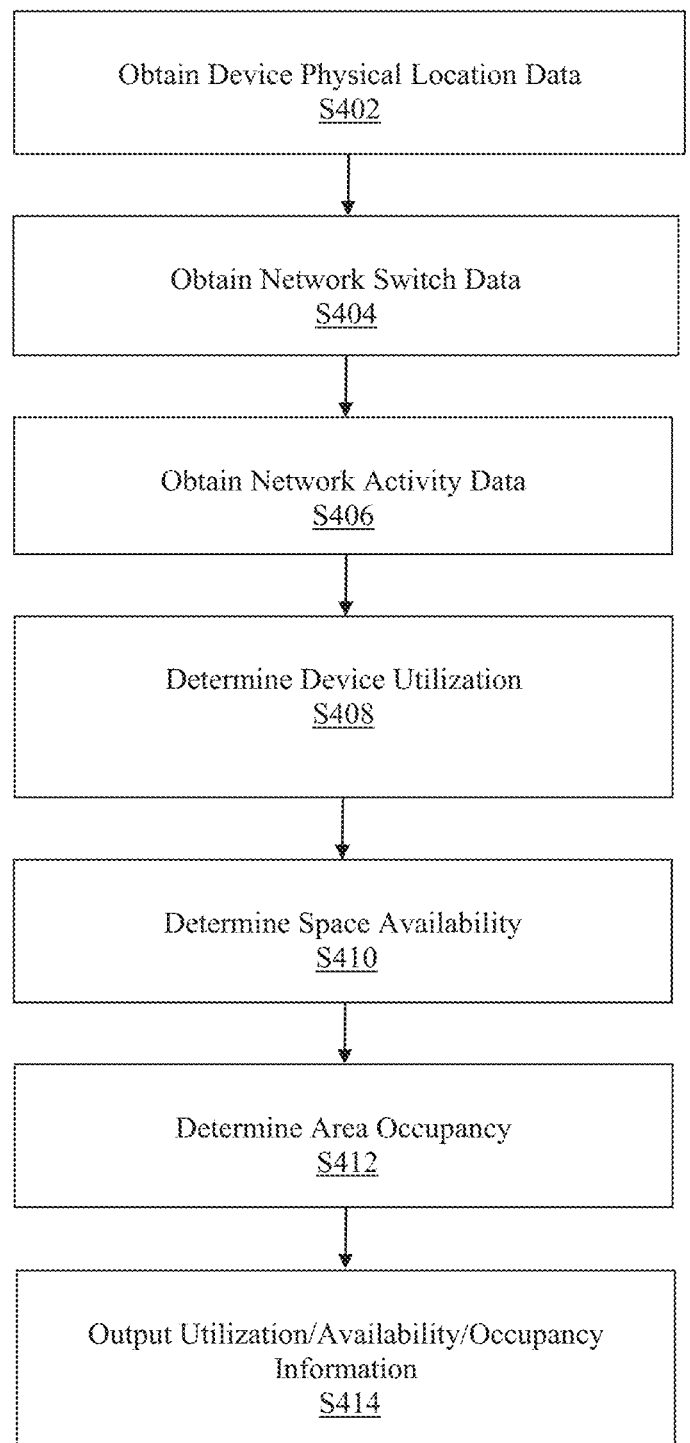
FIG. 4 is a flowchart of an exemplary process for implementing a method for tracking device inventory and utilization.

In the process 400 of FIG. 4, at step S402, the equipment inventory and utilization tracking module 302 obtains first data that relates to a physical location of a device. In an exemplary embodiment, the physical location data may include any one or more of a building identification, a floor number, and/or a seat identification that indicates where the device is physically located.

Figure 5:
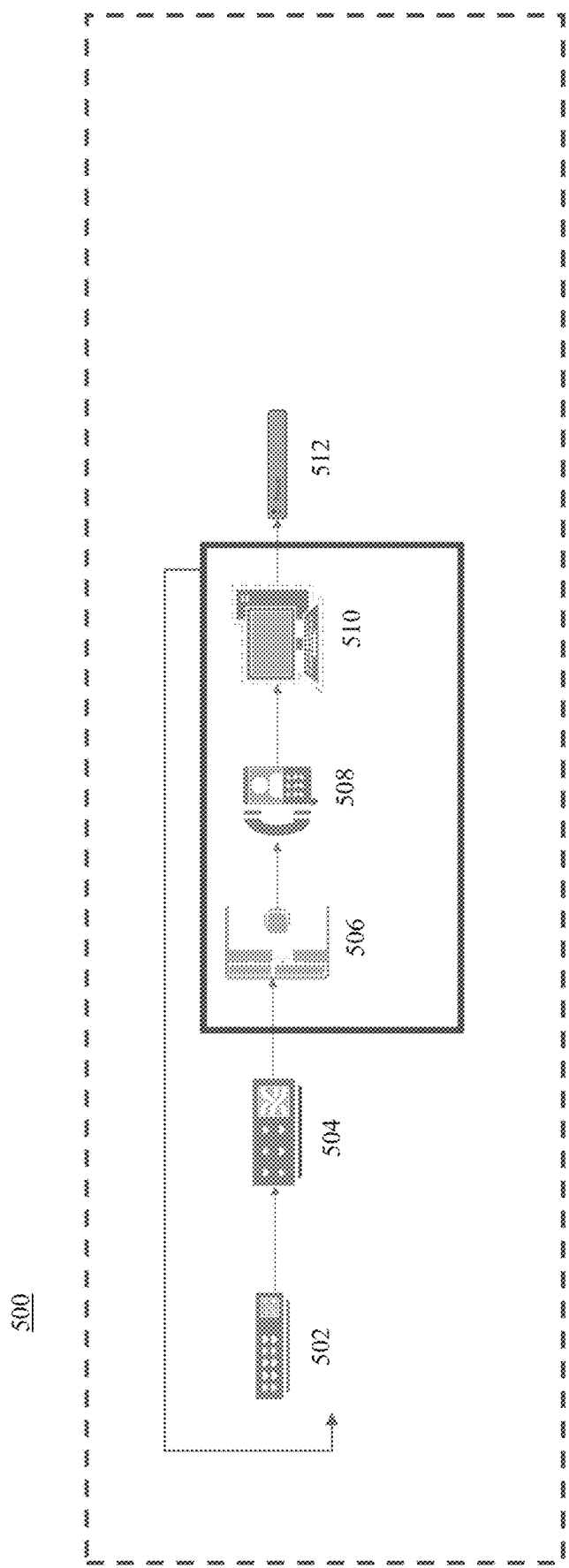
FIG. 5 illustrates an exemplary equipment configuration for collecting scan data that is usable for tracking device inventory and utilization, according to an exemplary embodiment.

At step S404, the equipment inventory and utilization tracking module 302 obtains second data that relates to network switch information that pertains to the device. In an exemplary embodiment, the network switch information may include any one or more of a switch host name, card information that relates to a seat associated with the device, and port information that relates to the associated seat. Referring also to FIG. 5, in an exemplary embodiment, the equipment inventory and utilization tracking module 302 may perform a Media Access Control (MAC) address scan of various equipments 506, 508, 510 associated with a particular seat in order to collect any one or more of a workstation number 506, a telephone identifier 508, and/or a virtual desktop infrastructure (VDI) number 510, and use the scanned MAC address data as the second data. In an exemplary embodiment, the MAC address scan may also be performed in order to collect other identification information, such as, for example, a laptop identifier, a desktop identifier, a video conference device identifier, and/or any network-connected device identifier.

At step S406, the equipment inventory and utilization tracking module 302 obtains third data that relates to a network activity that is being performed by the device. In an exemplary embodiment, the equipment inventory and utilization tracking module may obtain the third data by determining each management system to into which the device is logged in on the network.

At step S408, the equipment inventory and utilization tracking module 302 uses the obtained data to determine a utilization of the device. Referring also to FIG. 5, in an exemplary embodiment, the obtained data may be used in conjunction with a security identification (SID) 512 associated with a user in order to determine an identification of a user that is associated with the device. In an exemplary embodiment, the obtained data may be used to determine technology information associated with the utilization of the device.

At step S410, the data aggregation and usage analysis module 302 uses the obtained data and the determined utilization information to determine a space availability associated with the device. In an exemplary embodiment, the space availability may refer to a seat availability; however, the space availability may refer to other types of spaces, such as, for example, a classroom, a hospital room, an office, or any other suitable type of space. Then, at step S412, the data aggregation and usage analysis module 302 uses the obtained data and the determined utilization information to determine occupancy information associated with a physical location of the device.

In an exemplary embodiment, the data aggregation and usage analysis module 302 performs the process 400 with respect to a large number of devices, and uses the results of such processing to determine a complete mapping of an infrastructure of a particular area associated with a subset of the devices. Then, at step S414, the data aggregation and usage analysis module 302 outputs the determined information in relation to any one or more of equipment utilization, seat availability, area occupancy, and/or any other data that has been collected or determined by analyzing the obtained data.

Referring to FIG. 5, an exemplary equipment configuration 500 for collecting scan data that is usable for tracking device inventory and utilization is illustrated, according to an exemplary embodiment. In the configuration 500 of FIG. 5, component 502 is a port on a switch, and component 504 is a jack at a patch panel. A MAC address scan may be performed with respect to various devices associated with a particular seat, in order to collect a workstation number 506, a telephone identifier 508, and a virtual desktop infrastructure (VDI) identifier 510, and the scanned information may be used to derive the switch port information 502. A security identification (SID) associated with a user 512 may also be used to derive login events from activity logs, e.g., to determine which user is associated with the devices 506, 508, 510 and also to determine which management systems are logged into via the devices 506, 508, 510.

Figure 6:
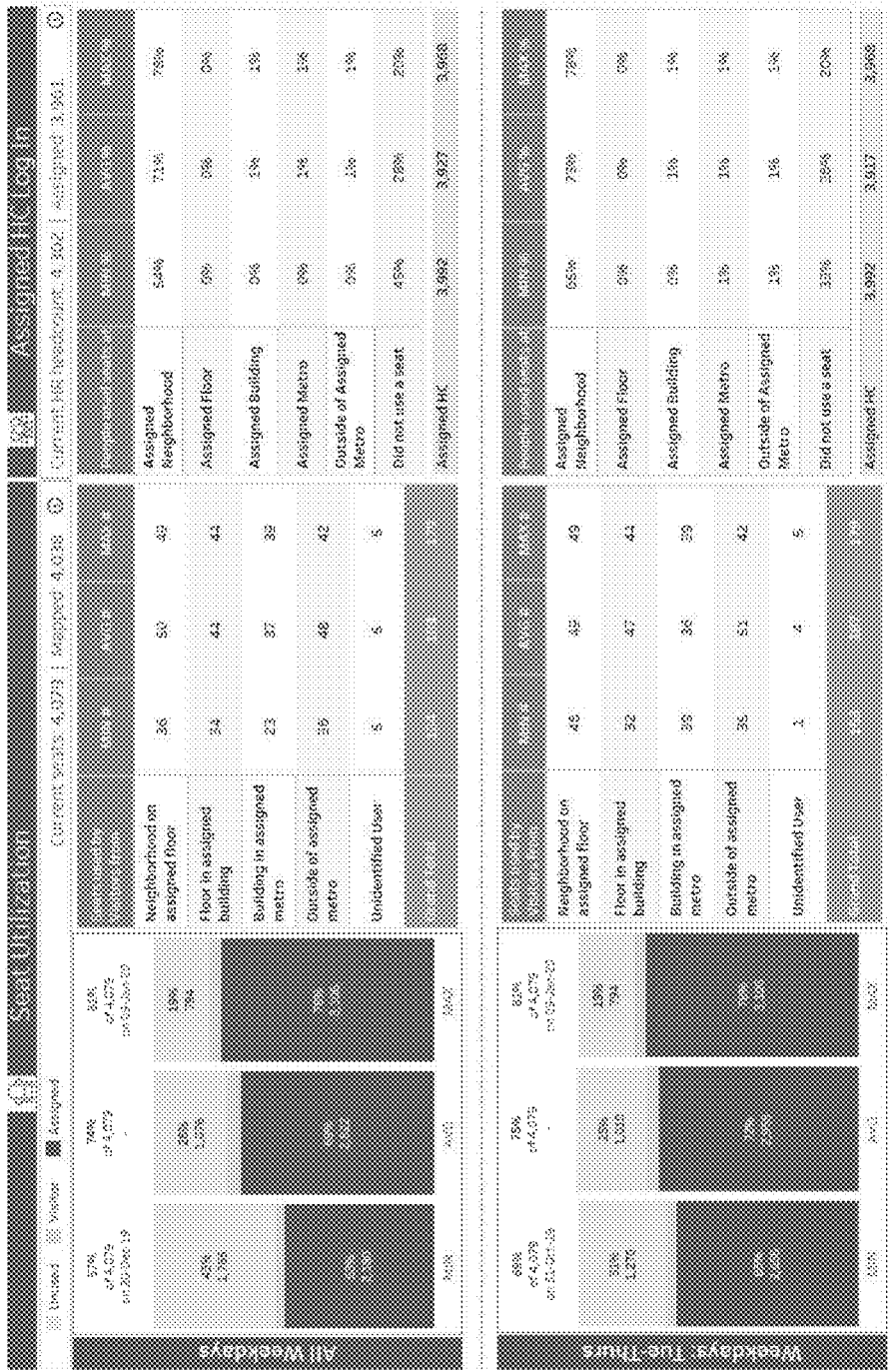
FIG. 6 illustrates a first screen shot that shows a portion of an output report generated by executing a method for tracking device inventory and utilization, according to an exemplary embodiment.

Referring to FIG. 6, a first screen shot 600 that shows a portion of an output report generated by executing a method for tracking device inventory and utilization is illustrated, according to an exemplary embodiment. The screen shot 600 displays a customizable dashboard that shows an example of seat utilization within a particular space in aggregate across a city, a building, and a floor over indicated time frames. In an exemplary embodiment, the information included in the dashboard may be useful to a real estate team for making decisions based on how frequently the space is being used and how many users should be assigned to the space.

Figure 7:
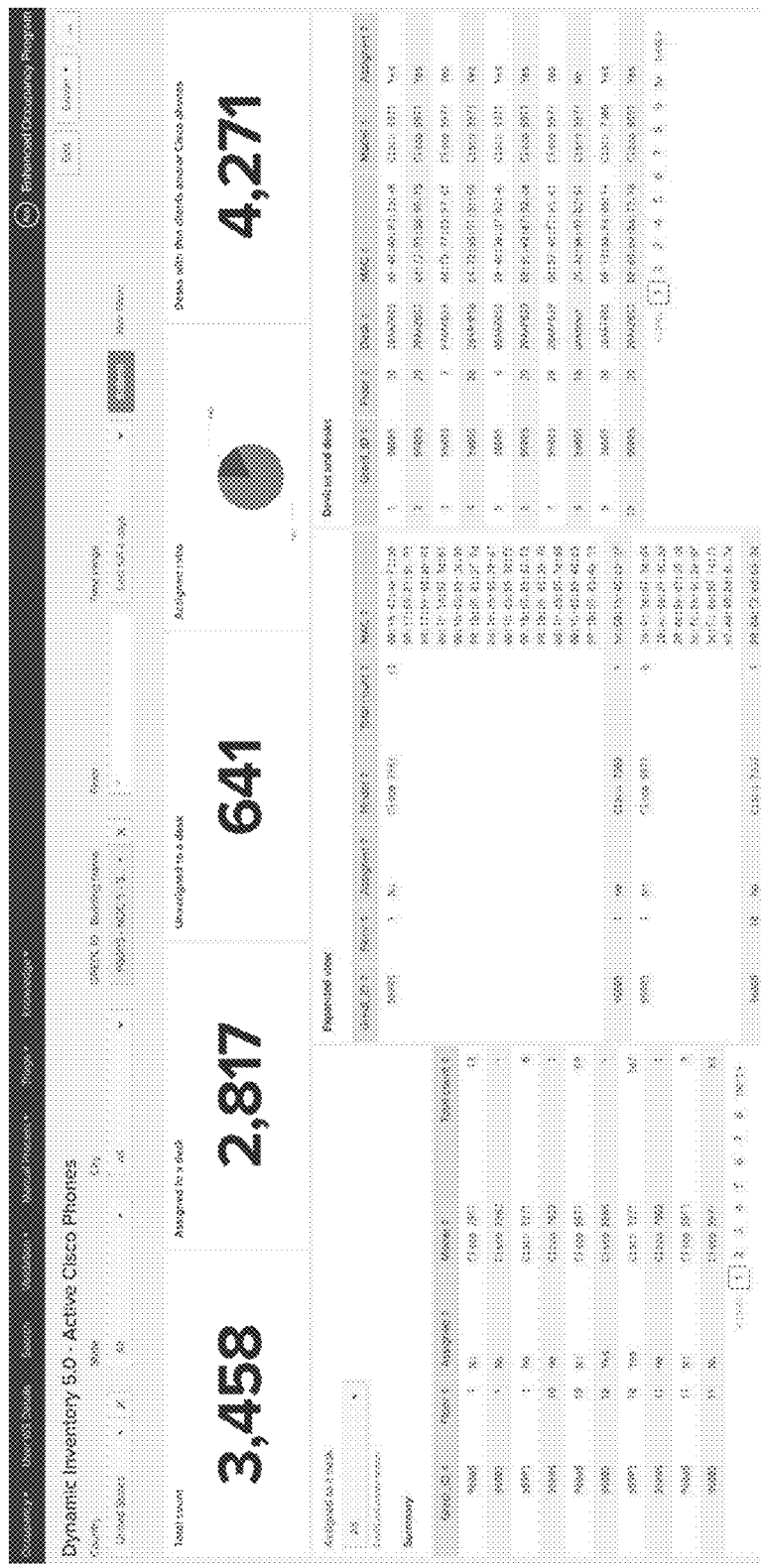
FIG. 7 illustrates a second screen shot that shows another portion of an output report generated by executing a method for tracking device inventory and utilization, according to an exemplary embodiment.

Referring to FIG. 7, a second screen shot 700 that shows another portion of an output report generated by executing a method for tracking device inventory and utilization is illustrated, according to an exemplary embodiment. The screen shot 700 displays a dashboard that shows a snapshot of an inventory for a particular device type, i.e., an active Cisco phone, for a specific building. The dashboard highlights specific model numbers and how many phones have a specific location versus a number of phones for which a location has not been determined.

Accordingly, with this technology, an optimized process tracking device inventory and utilization is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for tracking device utilization, the method being implemented by at least one processor, the method comprising:
    obtaining first data that relates to a respective physical location of each of a plurality of devices within a first area;
    obtaining second data that relates to respective network switch information of each of the plurality of devices within the first area;
    obtaining third data that relates to a respective network activity being actively performed by using each of the plurality of devices within the first area;
    using each of the first data, second data, and third data to determine a respective utilization of each of the plurality of devices within the first area that indicates at least one from among a frequency of usage of each of the plurality of devices within the first area and a usage availability of each of the plurality of devices within the first area that includes a total number of devices contained in an inventory of the plurality of devices and a number of unassigned devices within the inventory of the plurality of devices; and
    outputting a result of the determination that includes a complete mapping of an infrastructure of the first area that includes a number of devices included in the plurality of devices, a number of devices from among the plurality of devices that are assigned to a desk, and a number of devices from among the plurality of devices that are unassigned to a desk.

2. The method of claim 1, wherein the first data includes at least one of a building identification, a floor number, and a seat identification.

3. The method of claim 1, wherein the second data includes at least one of a switch host name, card information that relates to a first seat, and port information that relates to the first seat.

4. The method of claim 1, further comprising determining an occupancy of a first area based at least in part on the determined utilization.

5. The method of claim 1, further comprising:
    determining a space availability with respect to a first space based at least in part on the determined utilization; and
    outputting information relating to the determined space availability and information relating to a technology associated with the first space.

6. The method of claim 1, further comprising:
    performing a Media Access Control (MAC) scan in order to collect at least one of a workstation number, a telephone identifier, a virtual desktop infrastructure (VDI) identifier, a laptop identifier, a desktop identifier, a video conference device identifier, and a network device identifier; and
    using the collected at least one of the workstation number, telephone identifier, VDI identifier, laptop identifier, desktop identifier, video conference device identifier, and network device identifier to obtain the second data.

7. The method of claim 1, wherein the obtaining the third data comprises determining each of at least one management system into which the device is logged in.

8. The method of claim 7, further comprising using a security identification (SID) associated with a user together with the obtained third data in order to determine the user of the device.

9. A computing apparatus for tracking device utilization, the computing apparatus comprising:
    a processor;
    a memory; and
    a communication interface coupled to each of the processor and the memory, wherein the processor is configured to:
        obtain first data that relates to a respective physical location of each of a plurality of devices within a first area;
        obtain second data that relates to respective network switch information of each of the plurality of devices within the first area;
        obtain third data that relates to a respective network activity being actively performed by using each of the plurality of devices within the first area;

use each of the first data, second data, and third data to determine a respective utilization of each of the plurality of devices within the first area that indicates at least one from among a frequency of usage of each of the plurality of devices and a usage availability of each of the plurality of devices that includes a total number of devices contained in an inventory of the plurality of devices and a number of unassigned devices within the inventory of the plurality of devices; and output, via the communication interface, a result of the determination that includes a complete mapping of an infrastructure of the first area that includes a number of devices included in the plurality of devices, a number of devices from among the plurality of devices that are assigned to a desk, and a number of devices from among the plurality of devices that are unassigned to a desk.

10. The computing apparatus of claim 9, wherein the first data includes at least one of a building identification, a floor number, and a seat identification.

11. The computing apparatus of claim 9, wherein the second data includes at least one of a switch host name, card information that relates to a first seat, and port information that relates to the first seat.

12. The computing apparatus of claim 9, wherein the processor is further configured to determine an occupancy of a first area based at least in part on the determined utilization.

13. The computing apparatus of claim 9, wherein the processor is further configured to:
determine a space availability with respect to a first space based at least in part on the determined utilization; and
output, via the communication interface, information relating to the determined space availability and information relating to a technology associated with the first space.

14. The computing apparatus of claim 9, wherein the processor is further configured to:
perform a Media Access Control (MAC) scan in order to collect at least one of a workstation number, a telephone identifier, a virtual desktop infrastructure (VDI) identifier, a laptop identifier, a desktop identifier, a video conference device identifier, and a network device identifier; and
use the collected at least one of the workstation number, telephone identifier, VDI identifier, laptop identifier, desktop identifier, video conference device identifier, and network device identifier to obtain the second data.

15. The computing apparatus of claim 9, wherein the processor is further configured to obtain the third data by determining each of at least one management system into which the device is logged in.

16. The computing apparatus of claim 15, wherein the processor is further configured to use a security identification (SID) associated with a user together with the obtained third data in order to determine the user of the device.

* * * * *